(12) United States Patent
Fusegi et al.

(10) Patent No.: US 7,780,565 B2
(45) Date of Patent: Aug. 24, 2010

(54) DIFFERENTIAL DEVICE

(75) Inventors: Masaaki Fusegi, Shimotsuga-gun (JP); Koji Ohtsuka, Shimotsuga-gun (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 0 days.

(21) Appl. No.: 11/823,700

(22) Filed: Jun. 27, 2007

(65) Prior Publication Data

US 2008/0015076 A1 Jan. 17, 2008

(30) Foreign Application Priority Data

Jun. 30, 2006 (JP) .............................. 2006-181927

(51) Int. Cl.
*F16H 48/06* (2006.01)
(52) U.S. Cl. ...................... 475/230; 475/160
(58) Field of Classification Search ................ 475/150, 475/230, 231, 160; 74/606 R, 607
See application file for complete search history.

(56) References Cited

U.S. PATENT DOCUMENTS

| | | | | |
|---|---|---|---|---|
| 4,612,825 A * | 9/1986 | Engle | ......................... | 475/235 |
| 5,951,431 A * | 9/1999 | Downs et al. | ................ | 475/230 |
| 6,743,136 B1 * | 6/2004 | Jensen | ......................... | 475/160 |
| 7,217,217 B2 * | 5/2007 | Santelli | ....................... | 475/230 |
| 7,264,568 B2 * | 9/2007 | Ludwig et al. | ............... | 475/233 |
| 7,320,659 B2 * | 1/2008 | Pritchard et al. | ............ | 475/331 |
| 2005/0137047 A1 * | 6/2005 | Hay | ............................ | 475/220 |

FOREIGN PATENT DOCUMENTS

JP 2005-214347 8/2005

* cited by examiner

*Primary Examiner*—Roger L Pang
*Assistant Examiner*—Erin D Bishop
(74) *Attorney, Agent, or Firm*—Morrison & Foerster LLP (57) ABSTRACT

A differential device for differentially distributing a driving force to axles along an axis is disclosed. The differential device has a case being capable of rotation about the axis, which includes a flange configured to receive the driving force and a shaft crossing the case perpendicularly to the axis; an opening defined by a peripheral border on an outer periphery of the case so as to allow access into the case, lateral extremities of which is deviated from a center of the shaft toward a direction opposite to the flange along the axis; and a differential gear set housed in and drivingly coupled to the case, the differential gear set including an input gear rotatable around the shaft and output gears so combined with the input gear as to differentially distribute the driving force to the output gears, the output gears being drivingly coupled to the axles.

9 Claims, 6 Drawing Sheets

DIFFERENTIAL DEVICE

CROSS-REFERENCE TO RELATED APPLICATIONS

This application is based upon and claims the benefit of priority from the prior Japanese Patent Applications No. 2006-181927 (filed Jun. 30, 2006); the entire contents of which are incorporated herein by reference.

BACKGROUND OF THE INVENTION

1. Field of the Invention

The present invention relates to a differential device applied to conveyance means such as automobiles.

2. Description of the Related Art

As is known, an automobile is equipped with a differential to distribute a driving force of an engine to right and left output axles. The differential allows differential motion between the axles and hence maintains traction of wheels with the road while the automobile is turning.

The differential is provided with a complex gear set for enabling the differential motion. In general, the gear set is housed in a differential case to which the engine inputs the driving force. For installation of the gear set in the differential case, some differential cases are capable of being divided into two pieces. Other differential cases are incapable of being divided and instead have openings so as to allow passage of the gear set therethrough. A structure of the latter is often referred to as "one-piece structure".

SUMMARY OF THE INVENTION

The present inventors have found that the one-piece structure may reduce stiffness and strength of the differential case because of existence of the openings. An object of the present invention is intended for overcoming this problem.

According to an aspect of the present invention, a differential device differentially distributes a driving force to axles along an axis. The differential device has a case being capable of rotation about the axis, which includes a flange configured to receive the driving force and a shaft crossing the case perpendicularly to the axis; an opening defined by a peripheral border on an outer periphery of the case so as to allow access into the case, lateral extremities of which is deviated from a center of the shaft toward a direction opposite to the flange along the axis; and a differential gear set housed in and drivingly coupled to the case, the differential gear set including an input gear rotatable around the shaft and output gears so combined with the input gear as to differentially distribute the driving force to the output gears, the output gears being drivingly coupled to the axles.

Preferably, the opening is so opened as to leave a periphery opposite to the flange, which radially projects over the opening.

Preferably, the opening is so dimensioned as to allow passage of any member to be housed in the case.

Preferably, the lateral extremities of the peripheral border define a widest portion of the opening, the widest portion being the widest among any portions of the opening along a direction perpendicular to the axis. More preferably, the widest portion comprises an enough width to allow passage of any member to be housed in the case. Still preferably, the differential device further has a through hole configured to fix the shaft, which is defined on the case and so positioned that a circular plane realized by rotating the center of the shaft about the axis does not cross the lateral extremities, or crosses the peripheral border on a side closer to the flange than the lateral extremities.

Preferably, the case further has a second opening so dimensioned as to allow passage of any member of the differential gear set.

Preferably, the case further has a second opening symmetrical to the opening with respect to the axis.

Preferably, the differential device further has a clutch assembly configured to lock differential motion between the output gears, the clutch assembly including a clutch member housed in the case, wherein the widest portion is so dimensioned as to allow passage of the clutch member.

Preferably, the clutch member is disposed between the differential gear set and the flange.

DETAILED DESCRIPTION OF THE PREFERRED EMBODIMENT

Certain embodiments of the present invention will be described hereinafter with reference to the appended drawings. Throughout the specification, claims and the drawings, an axial direction is defined as a direction along an axis of a differential device unless any other particular explanation is given, and a lateral direction is defined as a direction perpendicular to the axial direction. The axial direction is drawn horizontally in FIGS. 1, 3, 4, 8 and 9.

A lock-up differential of a bevel gear type is exemplified in the following description, however, needless to say, the present invention is not limited thereto.

First Embodiment

FIGS. 1-7 illustrate a differential device 1 in accordance with a first embodiment of the present invention. In the following description, the right and the left are correspondent to those of FIGS. 1 and 2.

Figure 1:
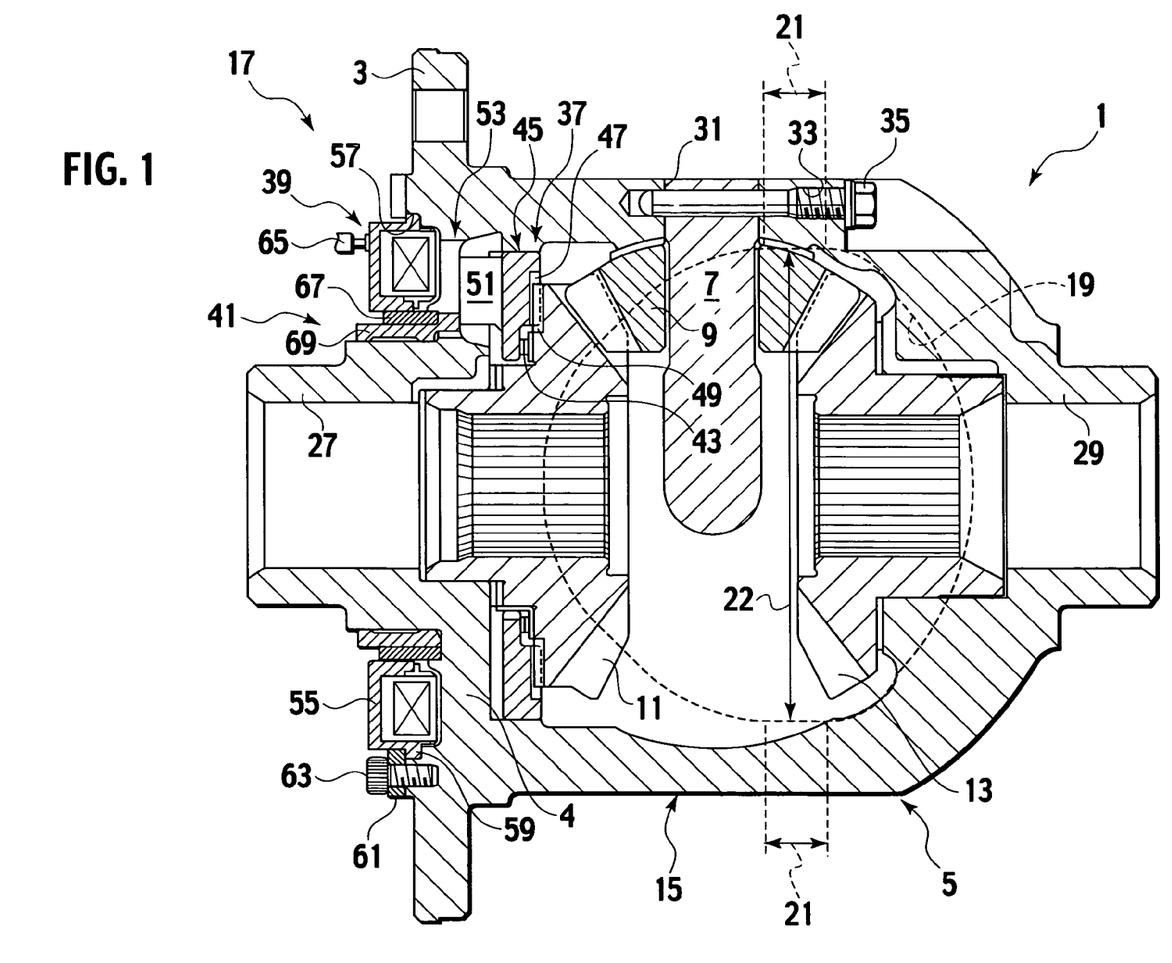
FIG. 1 is a sectional view of a differential device in accordance with a first embodiment of the present invention, illustrating a differential-lock state.

Referring to FIG. 1, the differential device 1 is provided with a differential case 5 which receives a driving force of an engine, a differential gear set 15 of a bevel gear type so as to differentially transmit the driving force to right and left side gears 11 and 13 respectively linked with right and left axles, a clutch assembly 17 for locking (or limiting) differential motion between the side gears 11 and 13, and a controller (not shown) for controlling the clutch assembly 17.

Figure 3:
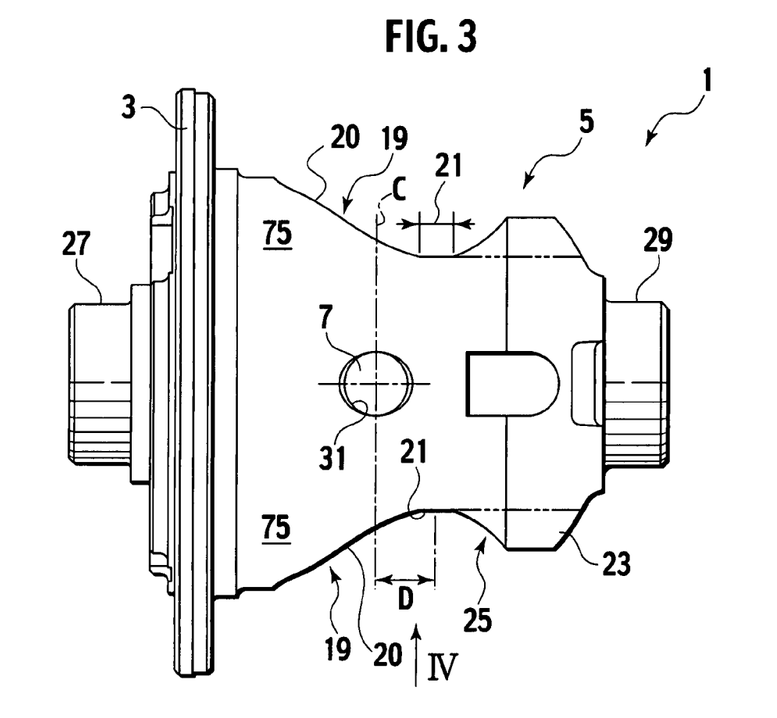
FIG. 3 is a plan view of a differential case of the differential device.

Referring to FIG. 3 in combination with FIG. 1, the differential case 5 has a drum portion having a substantially cylindrical outer periphery, a flange portion 3 radially extending from the drum portion, and a pair of axially projecting boss portions 27 and 29. The flange portion 3, to which a ring gear is fixed, is to receive the driving force of the engine. The boss portions 27 and 29 of the differential case 5 are rotatably supported by a differential carrier (not shown). Bearings respectively intervene between each boss portion and the differential case for smooth rotation of the differential case 5 but are not shown in the drawings.

The differential case 5 has through holes 31 for supporting a pinion shaft 7 described later, which penetrate the outer periphery from the exterior to the interior, and a bolt hole 33 crossing one of the through holes 31.

Figure 4:
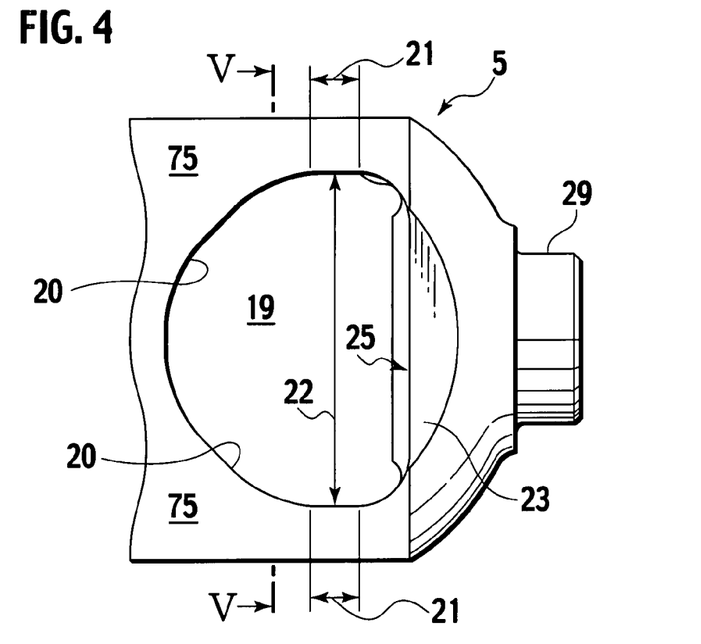
FIG. 4 is a partial front view of the differential case, viewed along an arrow IV of FIG. 3.
Figure 5:
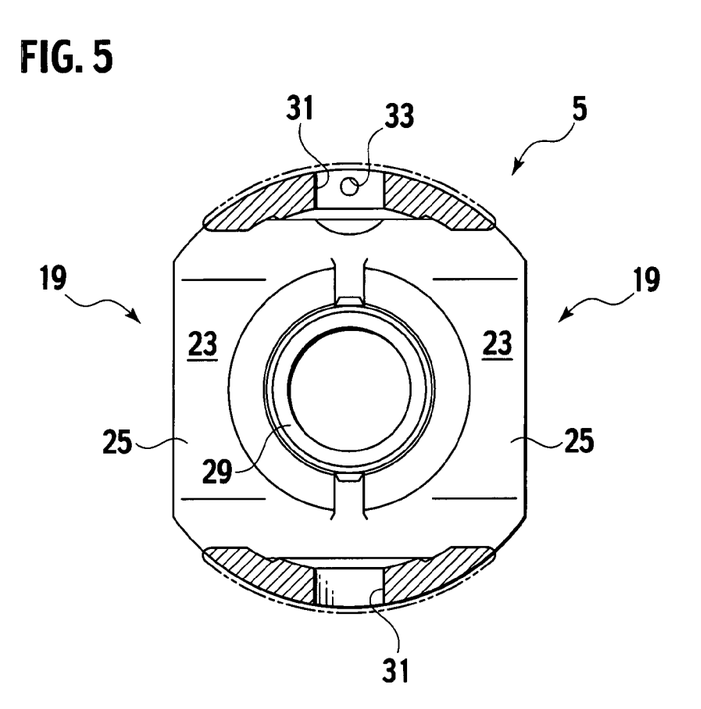
FIG. 5 is cross sectional view of the differential case, taken from a line V-V of FIG. 4.
Figure 6:
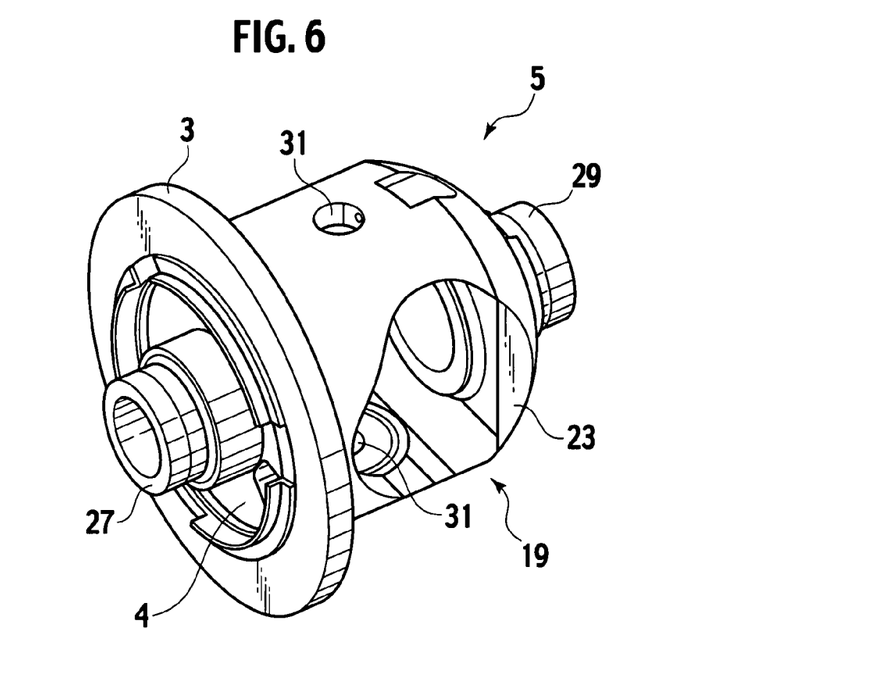
FIG. 6 is a perspective view of the differential case.
Figure 7:
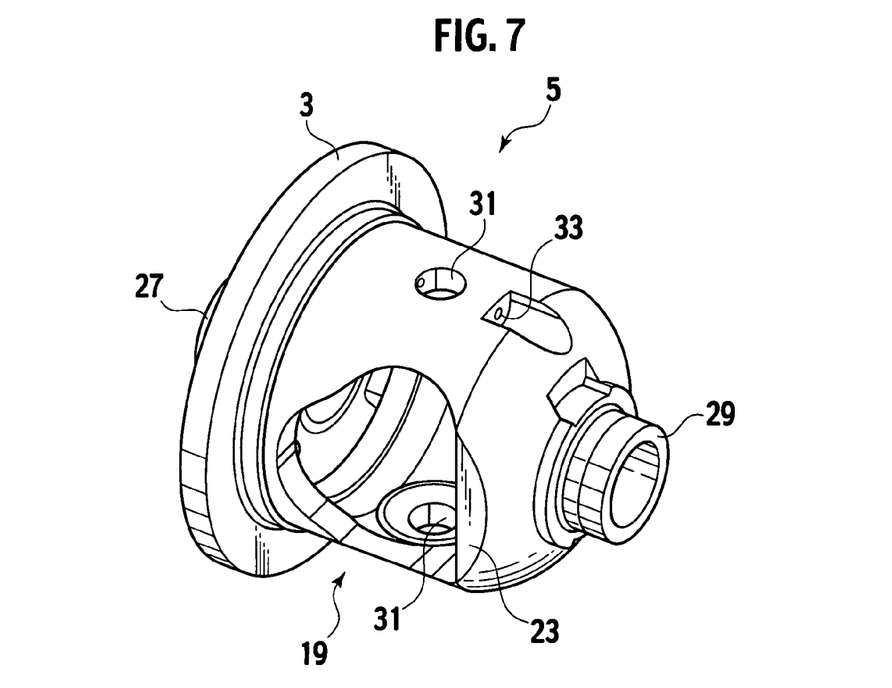
FIG. 7 is another perspective view of the differential case.

The outer periphery of the differential case has other openings 19 through which the interior of the differential case 5 is accessible. The openings 19 are respectively formed in an irregular oval shape and are symmetrical with each other with respect to the axis of the differential case 5. In the plan view as shown in FIG. 3, the openings 19 are in the shape of a pair of concavities and, in the front view as shown in FIGS. 1 and 4, the openings 19 coincide with each other and therefore appear to be a single irregular oval opening. Peripheral borders 20 of the openings 19 are shown as a closed broken line in FIG. 1 and shown as a closed solid line in FIG. 4.

Lateral extremities 21 of each peripheral border 20, which are the utmost portions in a lateral direction, define a widest portion 22 of each opening 19. More specifically, the extremities 21 are the most distant portions from each other among any portions on the periphery in a direction lateral to the axis of the differential case 5 and the widest portion 22 defined thereby is the widest among any portions of the opening 19 along the lateral direction. The extremities 21 may have certain lengths along the axial direction as shown in FIGS. 1 and 4. The widest portion 22 has an enough width to allow passage of any components to be installed in the differential case 5, particularly a clutch ring 45 described later.

A disposition of the lateral extremities 21, or more specifically the widest portion 22, in the axial direction is deviated from an axis of the pinion shaft 7 toward a direction opposite to the flange portion 3. If a circular plane realized by rotating the axis of the pinion shaft 7 is supposed (illustrated as a line C in FIG. 3), the circular plane is deviated from the lateral extremities 21 toward the flange portion 3. In other words, the circular plane does not cross the lateral extremities 21 but crosses the peripheral border 20 at a side closer to the flange portion 3. In the plan view of FIG. 3, the lateral extremities 21 are shown as a bottom of each concavity and the disposition of the widest portions 22 have an offset D from the axis of the pinion shaft 7. The widest portion 22 is disposed such that the lateral extremities 21 have a small overlap or no overlap with the through hole 31 along the axis of the case 5.

The peripheral border 20 of each opening 19 at the side of the flange portion 3 is like a slope from the widest portion 21 toward the flange portion 3. Another side 25 of the peripheral border 20 opposite to the aforementioned side with respect to the widest portions 21 is relatively far from the flange portion 3. A portion 23 of the outer periphery of the differential case 5, which is farther from the flange portion 3 than the side 25, projects radially outward.

The differential gear set 15 generally consists of the pinion shaft 7, pinion gears 9, and a pair of side gears 11 and 13. The pinion shaft 7 radially crosses the differential case 5. The pinion gears 9 are rotatably supported by the pinion shaft 7.

The side gears 11 and 13 engage with the pinion gears 9 from respectively left and right sides. Internal surfaces of the side gears 11 and 13 are splined so as to drivingly engage with left and right axles. Thereby, when the engine of the automobile drives the differential case 5, the driving force is differentially distributed to the left and right axles via the side gears 11 and 13.

The differential case 5 is further provided with a support portion 57 formed at a side thereof, from which the flange portion 3 extends. The support portion 57 is formed to be a circular internal periphery in such a way as to slidably fit on and support a coil housing 55 of a solenoid 39 in a radial direction. A plurality (three in this example) of plates 61 slidably engage with the solenoid 39 and pairs of bolts 63 respectively fix the plates 61 to the differential case 5. The coil housing 55 of the solenoid 39 is anti-rotated whereas the differential case 5 is capable of rotating. Therefore relative rotation occurs between the coil housing 55 and the differential case 5.

The clutch assembly 17 generally consists of a dog clutch 37 and an actuator for driving the dog clutch 37. The dog clutch 37 locks the side gears 11 and 13 relative to the differential case 5 and therefore prevents differential motion therebetween when the dog clutch 37 is made engaged by the plunger 41.

Figure 2:
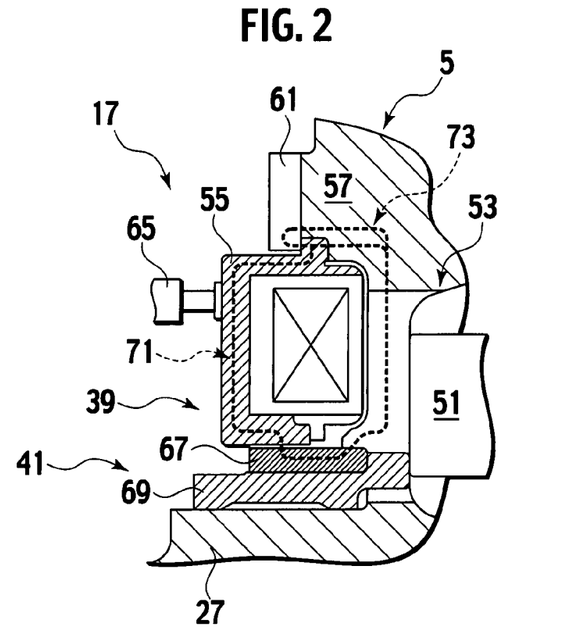
FIG. 2 is a magnified sectional view of the differential device with respect to a solenoid and its proximity.

Referring to FIG. 2, the actuator in the present embodiment employs an electromagnetic actuator but not limited thereto. The actuator generally consists of a solenoid 39, a plunger 41 operated by the solenoid 39 to engage the dog clutch 37, a return spring 43 and a controller (not shown). The return spring 43 urges the dog clutch 37 into a disengaging state. The coil housing 55 in combination with a portion 4 of the differential case 5, where the solenoid 39 adjoins, encloses a winding of the solenoid 39 but leaves a gap at an internal periphery thereof.

The plunger 41 generally consists of a moving yoke 67 and a ring 69 fitting with the moving yoke 67. The moving yoke 67 spans the aforementioned gap left between the coil housing 55 and the differential case 5. The coil housing 55, the differential housing 5, and the moving yoke 67 are made of a magnetic material such as, but not limited to, AISI SAE1010 (JIS S10C). Thereby, a magnetic flux 71 generated by the solenoid 39 takes a form of a loop via the coil housing 55, the differential case 5, and the moving yoke 67, as shown in FIG. 2. In the strict sense, where a radially outer end 59 of the coil housing 55 adjoins the support portion 57, the magnetic flux 71 branches into two flux paths, namely a first flux path 73 via the plate 61 and a second flux path directly going into the differential case 5, and merge into a single flux. A lead line 65 is led out of the solenoid 39 and further conducted out of the differential carrier to link with a battery via the controller so that the controller controls excitation of the solenoid 39.

A ring 69 made of a non-magnetic material drivingly fits in the moving yoke 67 and slidably fits on the left boss portion 27. Thereby the moving yoke 67 and the ring 69 are unitarily movable along the left boss portion 27. By non-magnetism of the ring 69, the magnetic flux 71 is prevented from leaking to the left boss portion 27.

The ring 69 has projections projecting in the axial direction toward the differential gear set 15. As being correspondent to the projections, the differential case 5 has openings 53, to which the projections are loosely and slidably inserted. Side faces in the rotational direction of the projections abut on peripheries of the openings 53 so that the ring 69 is rotated unitarily with the differential case 5. As the coil housing 55 is anti-rotated, relative rotation occurs between the coil housing 55 and the ring 69.

The dog clutch 37 generally consists of teeth 47 formed on a right side of a clutch ring 45 and teeth 49 formed on a left side of the left side gear 11. The teeth 47 and the teeth 49 are opposed to each other and therefore capable of engaging with each other.

The clutch ring 45 is supported by the internal periphery of the differential case 5 to be axially movable. The clutch ring 45 is provided with projections 51 as facing to the projections of the ring 69. As the projections 51 respectively face to the projections of the ring 69, motion of the moving yoke 67 toward the dog clutch 37 (rightward in FIGS. 1 and 2) is transmitted to the dog clutch 37 via the butted projections so that the dog clutch 37 is made engaged. When the dog clutch 37 is in the engaging state, the differential motion between the left and right side gears 11 and 13 is locked.

The projections 51 respectively have side faces which are respectively oblique to the rotation direction. The openings 53 also have oblique cam faces as correspondent to these oblique faces. A combination of the side faces of the projections 51 and the cam faces of the openings 53 compose a cam for converting torque of the differential case 5 into an axial force on the clutch ring 45 to assist the engagement of the dog clutch 37. With a help of this assistance, the solenoid 39 do not have to generate relatively large magnetic force to maintain the engaging state of the dog clutch 37. As opposed to the engagement force on the dog clutch 37, the return spring 43 urges the dog clutch 37 into the disengaging state unless the plunger 41 gives force to the dog clutch 37.

Thereby, when the solenoid 39 is excited, the dog clutch 37 is driven into the engaging state. Then the differential motion of the differential gear set 15 is locked. When the excitation is cut off, the return spring 43 urges the dog clutch 37 into the disengaging state. Then the differential motion of the differential gear set 15 is allowed.

Most components of the differential gear set 15 and the clutch ring 37 are inserted through the openings 19 into the differential case 5 and then installed. The pinion shaft 7 is inserted into the through holes 31 and prevented from displacing by a bolt 35 tightened in the bolt hole 33. Further lubrication oil flows in and out of the openings 19.

In the cylindrical outer periphery of the differential case 5, portions 75 close to the flange portion 3 must bear far larger twisting moment than other portions (see FIG. 3) as the force is input into the flange portion 3 and output to the pinion shaft 7 mainly via the portions 75. In contrast, existence of the openings 19 may reduce stiffness and strength of the differential case 5 around the openings 19, particularly the widest portions 22 thereof. As the disposition of the widest portions 22 is deviated from the axis of the pinion shaft 7 toward the direction opposite to the flange portion 3 by the length of the offset D, the portions 75 have sufficient widths to have enough stiffness and strength to bear the force input to the flange portion 3. Further, as the circular plane realized by rotating the axis of the pinion shaft 7 does not cross the lateral extremities 21 but crosses the peripheral border 20 at the side closer to the flange portion 3, a sufficient width from the through hole 31 to the peripheral border 20 along this circular plane can be held. This leads to sufficient stiffness and strength of the differential case 5 in the circumferential direction.

Second Embodiment

Figure 8:
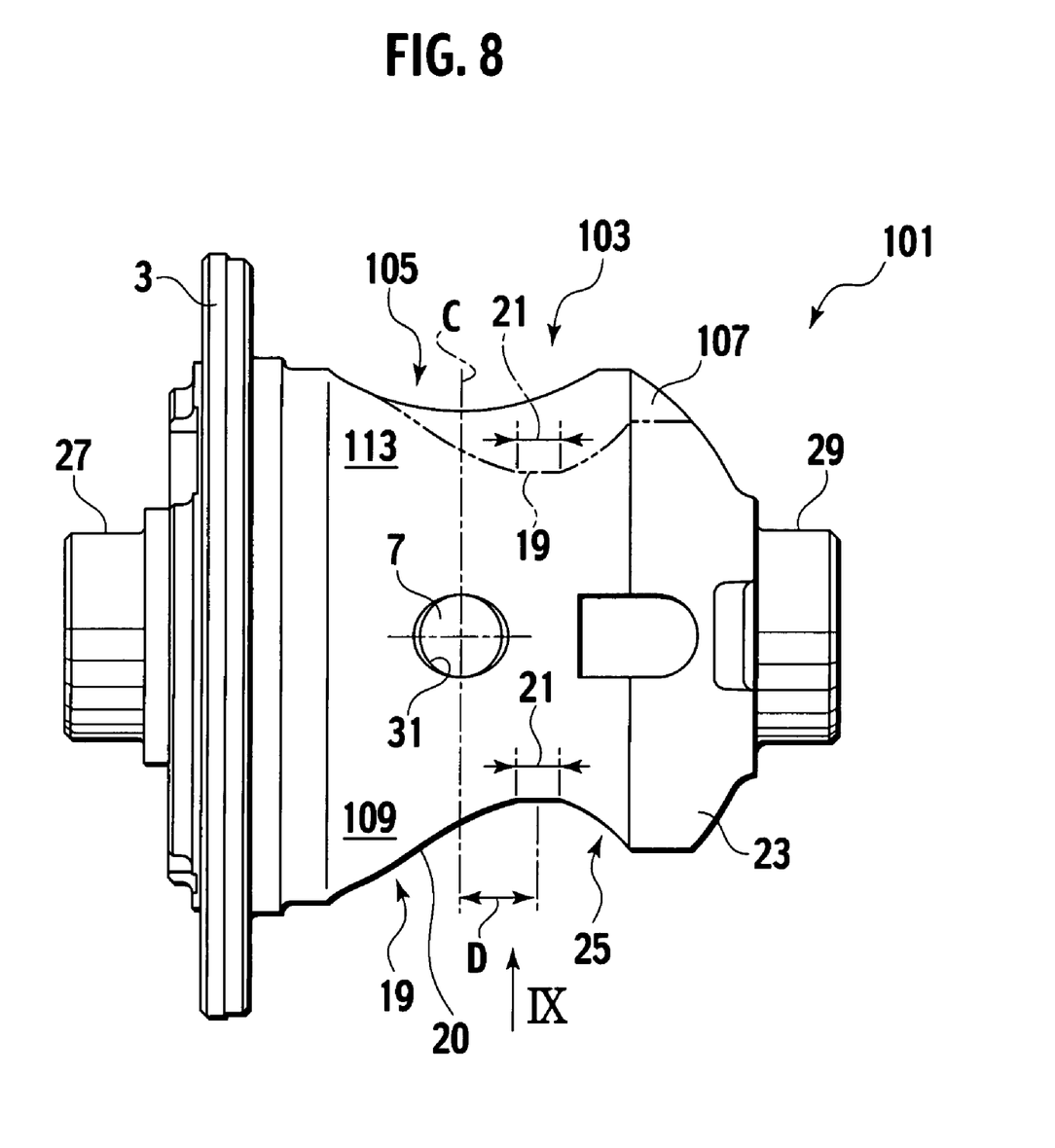
FIG. 8 is a plan view of a differential case of a differential device in accordance with a second embodiment of the present invention.
Figure 9:
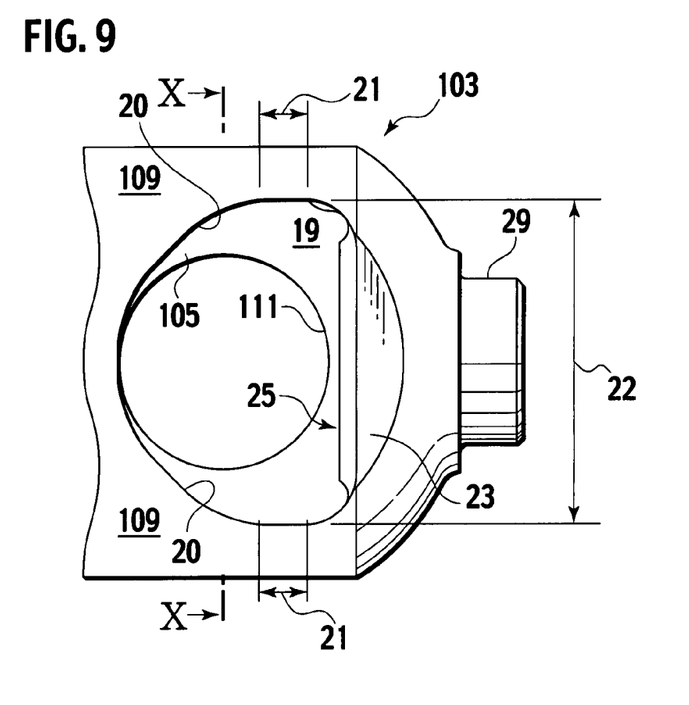
FIG. 9 is a partial front view of the differential case, viewed along an arrow IX of FIG. 8.
Figure 10:
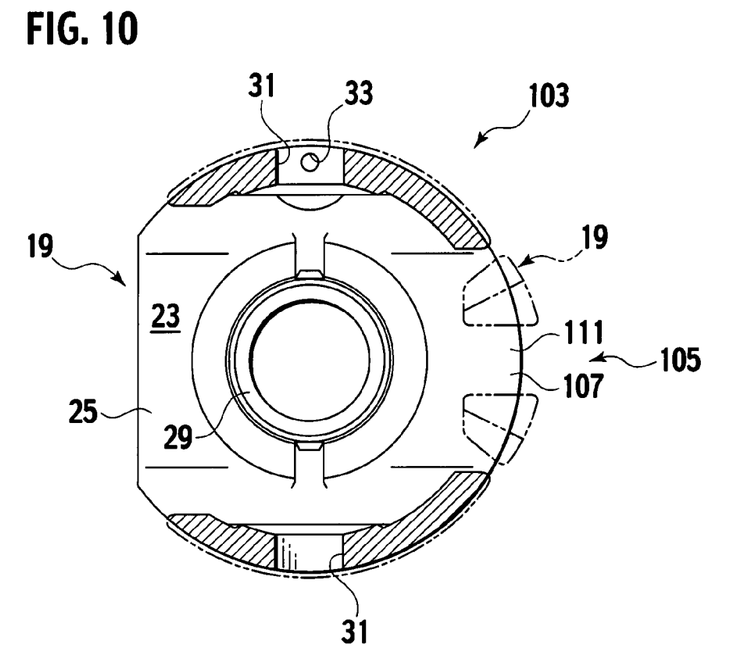
FIG. 10 is a cross sectional view of the differential case, taken from a line X-X of FIG. 9.

FIGS. 8-10 illustrate a differential device 101 in accordance with a second embodiment of the present invention. In the following description, the right and the left are correspondent to those of FIGS. 8 and 9. Substantially the same elements as any of the aforementioned elements are referred to as the same reference numerals and detailed descriptions thereof will be omitted. The following description will be mainly given to differences from the aforementioned first embodiment.

The differential device 101 is provided with a differential case 103 having an opening 19 and an opening 105 for allowing passage of internal components therethrough. As with the opening 19 in accordance with the aforementioned first embodiment, the opening 19 in accordance with the present second embodiment is formed in an irregular oval shape and has a widest portion 22 where a width of the opening 19 along the circumferential direction of the outer periphery of the differential case 103 is largest. The widest portion 22 has an enough width to allow passage of any components to be installed in the differential case 103. The disposition of the widest portion 22 in the axial direction is deviated from a center of a pinion shaft 7 toward a direction opposite to a flange portion 3. A circular plane (shown as a line C in FIG. 8) realized by rotating the axis of the pinion shaft 7 does not cross the lateral extremities 21 but crosses the peripheral border 20 at a side closer to the flange portion 3.

The opening 105 has different dimensions from those of the opening 19. The opening 105 is a substantially round opening and has enough dimensions to allow passage of the pinion gears 9. The opening 105 and the opening 19 are opposed to each other with respect to the axis of the differential case 101. The opening 105 is generally smaller than the opening 19. This may be understood from a comparison between a solid line of the opening 105 and a two-dot chain line showing a hypothetical curve as if the opening 19 exists around the opening 105. As a result of smallness of the opening 105, a portion 107 larger than the portion 23 is left at a periphery of the opening 105 opposed to the flange portion 3.

As the disposition of the widest portion 22 is deviated from the center of the pinion shaft 7 toward the direction opposite to the flange portion 3 by the length of the offset D and the opening 105 is smaller than the opening 19, portions 109 and 112 have sufficient widths to have enough stiffness and strength to bear the force input to the flange portion 3. Further, as the relatively large portion 107 is left, the differential case 103 has a large stiffness particularly to tension stress induced by a thrust load on the flange portion 3.

In the above description, the invention is applied to a lockup differential of a bevel gear type. However, the invention is also applied to any other differentials such as a free-running differential in which transmission of power to a differential can be intermitted, and an axle disconnect device in which transmission to both axles can be intermitted. Further, applicable types are not limited to the bevel gear type but may range over any types. Moreover, a differential in accordance with any embodiments of the present invention can be applied to a front differential, a center differential and a rear differential.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A differential device for differentially distributing a driving force to axles along an axis, the differential device comprising:
    a case being capable of rotation about the axis, the case including a flange configured to receive the driving force, and a shaft crossing the case perpendicularly to the axis;

an opening defined by a peripheral border on an outer peripheryof the case so as to allow access into the case, the peripheral border being formed to be line-symmetrical about a line parallel to the axis and including lateral extremities defined by parallel portions that connect two curves and being respectively furthermost among any portions of the peripheral border from the line to define a widest portion and deviated from a center of the shaft toward a direction opposite to the flange along the axis;

a differential gear set housed in and drivingly coupled to the case, the differential gear set including an input gear rotatable around the shaft and output gears so combined with the input gear as to differentially distribute the driving force to the output gears, the output gears being drivingly coupled to the axles; and a through hole configured to fix the shaft, the through hole being defined on the case and so positioned that the circular plane realized by rotating the center of the shaft about the axis does not cross the lateral extremities.

2. The differential device of claim 1, wherein a portion of the outter periphery that is around the opening and opposite to the flange projects radially outward.

3. The differential device of claim 1, wherein the opening is so dimensioned as to allow passage of any member to be housed in the case.

4. The differential device of claim 1, wherein the widest portion comprises an enough width to allow passage of any member to be housed in the case.

5. The differential device of claim 1, further comprising:
a through hole configured to fix the shaft, the through hole being defined on the case and so positioned that a circular plane realized by rotating the center of the shaft about the axis crosses the peripheral border on a side closer to the flange than the lateral extremities.

6. The differential device of claim 1, wherein the case further includes a second opening so dimensioned as to allow passage of any member of the differential gear set.

7. The differential device of claim 1, wherein the case further includes a second opening symmetrical to the opening with respect to the axis.

8. The differential device of claim 1, further comprising:
a clutch assembly configured to lock differential motion between the output gears, the clutch assembly including a clutch member housed in the case, wherein the widest portion is so dimensioned as to allow passage of the clutch member.

9. The differential device of claim 8, wherein the clutch member is disposed between the differential gear set and the flange.

* * * * *